United States Patent [19]

Sato

[11] 4,156,273
[45] May 22, 1979

[54] PROTECTION OF A SWITCHING REGULATOR

[75] Inventor: Takehisa Sato, Gunma, Japan

[73] Assignees: Sanyo Electric Co., Ltd., Moriguchi; Tokyo Sanyo Electric Co., Ltd., Gunma, both of Japan

[21] Appl. No.: 837,762

[22] Filed: Sep. 29, 1977

[30] Foreign Application Priority Data

Oct. 7, 1976 [JP]   Japan .................... 51-122175
Oct. 7, 1976 [JP]   Japan .................... 51-122176
Oct. 7, 1976 [JP]   Japan .................... 51-136971

[51] Int. Cl.² ............... H02M 1/18; H02M 3/335
[52] U.S. Cl. ............... 363/56; 323/DIG. 1; 363/21; 363/80
[58] Field of Search ........... 323/17, 20, DIG. 1; 363/15, 18–21, 34, 37, 56, 79, 80, 124, 131

[56] References Cited

U.S. PATENT DOCUMENTS

| | | | |
|---|---|---|---|
| 3,641,267 | 2/1972 | Cavallari | 323/DIG. 1 |
| 4,030,024 | 6/1977 | Chambers et al. | 323/DIG. 1 |
| 4,037,271 | 7/1977 | Keller | 363/80 X |
| 4,058,758 | 11/1977 | Peterson | 363/80 |
| 4,063,307 | 12/1977 | Stephens | 363/21 |
| 4,073,003 | 2/1978 | Chambers et al. | 363/20 |

Primary Examiner—A. D. Pellinen
Attorney, Agent, or Firm—Darby & Darby

[57] ABSTRACT

A transformer coupled switching regulator power supply having current-limiting circuits and under-voltage detecting circuits on the primary side of the power transformer. The under-voltage detection circuit acts to substantially terminate the flow of current through the switching circuits in the case of a short circuit in the load.

15 Claims, 9 Drawing Figures

PROTECTION OF A SWITCHING REGULATOR

BACKGROUND OF THE INVENTION

1. Field of the Invention

The present invention relates to a switching regulator, and more specifically to a protection circuit for a switching regulator.

2. Description of the Prior Art

Various types of stabilized power supply circuits have been proposed and put in practical use. Of late, some types of stabilized power supply circuits employ a power transistor. If such stabilized power supply circuits undergo an overload, for example, because of short circuiting in the load, or the like, some circuit components such as a power transistor are liable to be overly driven and damaged. If such components are damaged, these must be replaced.

For the purpose of protecting the circuit from such an overload in switching regulators, various types of protection circuits have also been proposed and put in practical use in switching regulators. FIG. 1 shows an ideal characteristic curve of such a protection circuit in a stabilized power supply circuit, wherein the ordinate indicates an output voltage while the abscissa indicates an output current. Referring to FIG. 1, an ideal characteristic curve of a stabilized power supply circuit with a protection circuit comprises a substantially horizontal portion A representing a constant or stabilized output voltage irrespective of the output current and an oblique portion B extending from a given critical output current point C representing a proportional decrease both in the output voltage and the output current. The constant region A shows an ideal charactertistic curve which is required as a constant or stabilized voltage source, while the oblique portion B shows an ideal characteristic curve which is required as a protection circuit for protecting the circuit from an overload whenever the output current exceeds the output current point C.

As microelectronics was recently developed, various electronic equipment was accordingly miniaturized. On the other hand, implementation of compact electronic equipment raised a requirement of a small sized stabilized voltage supply circuit. A switching regulator has been proposed and put in practical use to provide a compact stabilized voltage supply circuit.

FIG. 2 shows a block diagram of a typical conventional switching regulator. Referring to FIG. 2, the switching regulator shown comprises a recitifier 1 coupled to receive an AC output from a commercial AC power supply. The rectifier 1 typically comprises a bridge connected four diodes, as well known to those skilled in the art. The output of the rectifier 1 is shunted by a capacitor which serves as a smoothing circuit. The output of the rectifying and smoothing circuit is connected through a primary winding of a high frequency transformer 3 to a switching transistor 2. The secondary winding of the high frequency transformer 3 is connected to another rectifying and smoothing circuit 4 for the purpose of converting the output of the high frequency transformer 3 into a direct current output. The input electrode of the switching transistor 2 is connected to receive the output from a switching control circuit 6. The switching control circuit 6 is connected to receive through a photocoupler PC the said direct current output of the rectifying and smoothing circuit 4 coupled to the secondary winding of the high frequency transformer 3. The switching control 6 is structured to be responsive to the said direct current output of the rectifying and smoothing circuit 4 to generate a train of high frequency pulses the pulse width of which is modulated as a function of the said direct current output of the rectifying and smoothing circuit 4. To that end, the switching control circuit 6 typically comprises a high frequency reference pulse generator for generating a train of reference pulses of a high frequency such as 20 to 50 KHz and a pulse width modulator for modulating the pulse width of the reference pulses as a function of the direct current output from the rectifying and smoothing circuit 4 received through the photocoupler PC. The high frequency transformer 3 typically comprises a ferrite core. The said direct current output of the rectifying and smoothing circuit 4 is withdrawn as a stabilized direct current output voltage. The switching control circuit 6 is connected to be energized by a stabilized direct current voltage. To that end, typically a voltage dividing circuit comprising a series connection of a resistor and a Zener diode is connected to the output of the rectifier 1 and the junction of the resistor and the Zener diode in the said series connection is connected to the switching control circuit 6 for the purpose of energization.

In operation, the AC output obtainable from the commercial AC power supply is rectified by the rectifier 1 and is smoothed by the capacitor. The output from the rectifier 1, as smoothed, is voltage divided and stabilized by the said series connection and is applied to the switching control circuit 6 for the purpose of energization. As a result, the switching control circuit 6 is operative to generate a train of high frequency switching control pulses to the input electrode of the switching transistor 2. As a result, the switching transistor 2 is on/off controlled in response to the switching control pulses. Accordingly, a current flows through the primary winding of the high frequency transformer 3 intermittently. The duty cycle of the current flowing through the primary winding of the high frequency transformer 3 is determined by the switching operation of the switching transistor 2. Since a current flows through the primary winding of the transformer 3 intermittently at the above described high frequency, a corresponding high frequency alternate current output is obtained across the secondary winding of the high frequency transformer 3. The high frequency alternate current output is rectified and smoothed by the rectifying and smoothing circuit 4, thereby to provide a direct current output. To direct current output is applied through the photocoupler PC to the switching control circuit 6 as a control signal. The switching control circuit 6 is responsive to the direct current output to modulate the pulse width of the reference pulses to a proper value. More specifically, if and when the direct current output voltage increases, the increase in the voltage as applied through the photocoupler PC to the switching control circuit 6 causes the width of the switching control pulses to be reduced, thereby to decrease the duty cycle of the current flowing through the primary winding of the transformer 3 and accordingly decrease the direct current output voltage from the rectifying and smoothing circuit 4, and vice versa. As a result, a stabilized or constant direct current volatage is obtained from the rectifying and smoothing circuit 4.

Now consider a case where a protection circuit is incorporated in the FIG. 2 switching regulator for the purpose of achieving an ideal protecting operation as shown in the FIG. 1 graph. To that end, simply a circuit for detecting an overload could be coupled to the rectifying and smoothing circuit 4 of the secondary side of the transformer 3 which could be coupled through another photocoupler to the control input of the pulse width modulator in the switching control circuit 6, such that the pulse width could be reduced responsive to an overload. In fact, such a circuit configuration could achieve a desired protection characteristic. Nevertheless, it has been found that such a circuit configuration requires several expensive components including the said additional photocoupler for the purpose of isolating the primary and secondary sides of the high frequency transformer 3 in conjunction with the protection circuit. Hence, there is room of improvement in such a circuit configuration.

For the purpose of avoiding the above described shortcomings, a resistor could be connected in series with the switching transistor 2 for the purpose of detecting an overload in terms of an increase in the primary current rather than in terms of an increase in the secondary output voltage. However, such an approach makes it difficult to detect a change in the secondary output voltage. Hence, according to such an approach, whenever an overload occurs, the switching control circuit 6 is controlled such that a primary current flowing through the switching transistor 2 is limited to a given constant current, or alternatively the switching transistor is controlled to be in a non-conductive state. However, in the former case where the switching control circuit 6 is controlled such that the primary current flowing through the switching transistor is limited to a given constant value, the switching transistor 2 is kept in such a constant limit current when an overload continues, resulting in an increased collector loss in the switching transistor 2 during the protecting operation and hence an overheat of the switching transistor in case of a continued overload state. On the other hand, in the latter case where the switching transistor is controlled to be in a non-conductive state in response to an overload, the switching transistor 2 is interrupted even in response to an instantaneous overload, which necessitates turning on again of a power supply switch for the purpose of resetting the circuit each time the circuit is interrupted in response to an overload. Hence, it is desired that an improved switching regulator is provided wherein the above described disadvantages have been eliminated.

SUMMARY OF THE INVENTION

Briefly described, the present invention comprises a switching regulator, comprising: alternate current power supply means, first rectifying means coupled to said alternate current power supply means for rectifying the alternate current output, means for generating high frequency pulses the duty cycle of which is variable as a function of a control signal, switching means coupled to said first rectifying means and responsive to said high frequency pulse output for on/off controlling the rectified output from said first rectifying means, high frequency transformer means coupled to receive the output from said switching means, second rectifying means coupled to said high frequency transformer means for rectifying the transformed output from said high frequency transformer means, means for supplying the rectified output from said second rectifying means to said high frequency pulse generating means as a control signal, said high frequency transformer means comprising an auxiliary winding, means operatively coupled to said switching means for detecting the current flowing through said switching means, means coupled to said current detecting means and said auxiliary winding for detecting a difference between the output from said current detecting means and the output from said auxiliary winding, and means operatively coupled to said high frequency pulse generating means and responsive to the difference detected output from said difference detecting means for reducing the duty cycle of the high frequency pulses obtainable from said high frequency pulse generating means, whereby a current flowing through said switching means is controlled to a less value whenever a given value of overload occurs.

According to the present invention, an overload is detected by means of an auxiliary winding coupled to a high frequency transformer. Thus, an overload can be detected with a simple auxiliary winding without resort to an additional photocoupler. Adoption of an auxiliary winding in the high frequency transformer in place of an additional photocoupler for the purpose of detecting an overload makes it possible to detect an overload with accuracy and with an inexpensive cost.

In a preferred embodiment of the present invention, the high frequency pulse generating means comprises a high frequency reference pulse generator for generating a train of high frequency reference pulses, and a pulse width modulator responsive to the rectified output from the second rectifying means for modulating the pulse width of the reference pulses as a function of the rectified output from the second rectifying means. Preferably, the pulse width modulator comprises a differentiation circuit for differentiating the reference pulses and a threshold level detector coupled to the differentiation circuit for level detecting the differentiated output from the differentiation circuit, wherein the time constant of the differentiation circuit is adapted to be variable as a function of the rectified output from the second rectifying means.

According to another aspect of the present invention, a further auxiliary winding is provided in the high frequency transformer which is coupled to a further rectifying means, which output is utilized to energize the high frequency pulse generating means. Preferably, the rectified output from the said further rectifying means is coupled through a switch circuit to the high frequency pulse generating means and the high frequency pulse generating means is also connected to be supplied with the rectified output from the first rectifying means through the said switch circuit, such that the high frequency pulse generating means is initially energized by the rectified output from the first rectifying means, but, after the rectified output from the said further rectifying means is once established, the high frequency pulse generating means is therafter energized by the rectified output from the said further rectifying means. Since the power for energizing the high frequency pulse generating means is normally obtained from the high frequency transformer by the use of the said further auxiliary winding, any voltage dividing circuit required when the pulse generating means is energized by the rectified output from the first rectifying means can be dispensed with, with the result that the power consumption caused by such voltage dividing circuit can be eliminated and hence the switching regulator can be made compact.

According to a further aspect of the present invention, the switching means comprises a switching transistor the storage time of which is selected to be larger than a half cycle of the high frequency pulses and the output pulses from the high frequency pulse generating means is applied through a differentiation circuit to the input electrode of the said switching transistor. Preferably, the time constant of the differentiation circuit is selected to be smaller than one fifth of the storage time of the said switching transistor. If the switching means is implemented as described above, then even a switching transistor of a larger storage time can be used for the purpose of high frequency switching, with the result that an inexpensive switching transistor can be used while such a switching transistor can be driven with a decreased driving power. As a result, a compact and inexpensive switching regulator can be provided.

Accordingly, a principal object of the present invention is to provide a compact and inexpensive switching regulator wherein a rectified direct current output is on/off controlled responsive to high frequency pulses and the output is withdrawn through a high frequency transformer and is rectified, the duty cycle of the said high frequency pulses being controlled as a function of the rectified direct current output.

Another object of the present invention is to provide an improved switching regulator wherein a protection circuit for protecting the regulator from an overload can be implemented with a simplified circuit configuration.

A further object of the present invention is to provide an improved switching regulator wherein a rectified direct current output is on/off controlled by means of switching means which is controlled by high frequency pulses from high frequency pulse generating means and the output is withdrawn through high frequency transformer means, and wherein energization circuit for the said high frequency pulse generating means is simplified.

Still a further object of the present invention is to provide an improved switching regulator, wherein a rectified direct current output is on/off controlled by means of switching means which is responsive to high frequency pulses from high frequency pulse generating means and the output is withdrawn through high frequency transformer means, and wherein the said switching means can be implemented with a switching transistor of a larger storage time.

These objects and other objects, features, aspects and advantages of the present invention will become more apparent from the following detailed description when taken in conjunction with the accompanying drawings.

DESCRIPTION OF THE PREFERRED EMBODIMENTS

Figure 2:
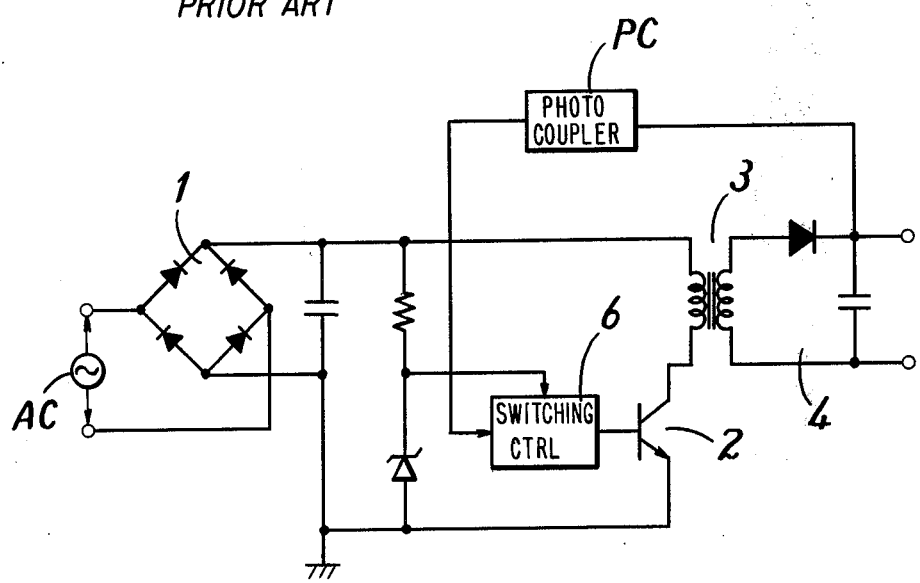
FIG. 2 shows a block diagram of a typical conventional switching regulator.
Figure 3:
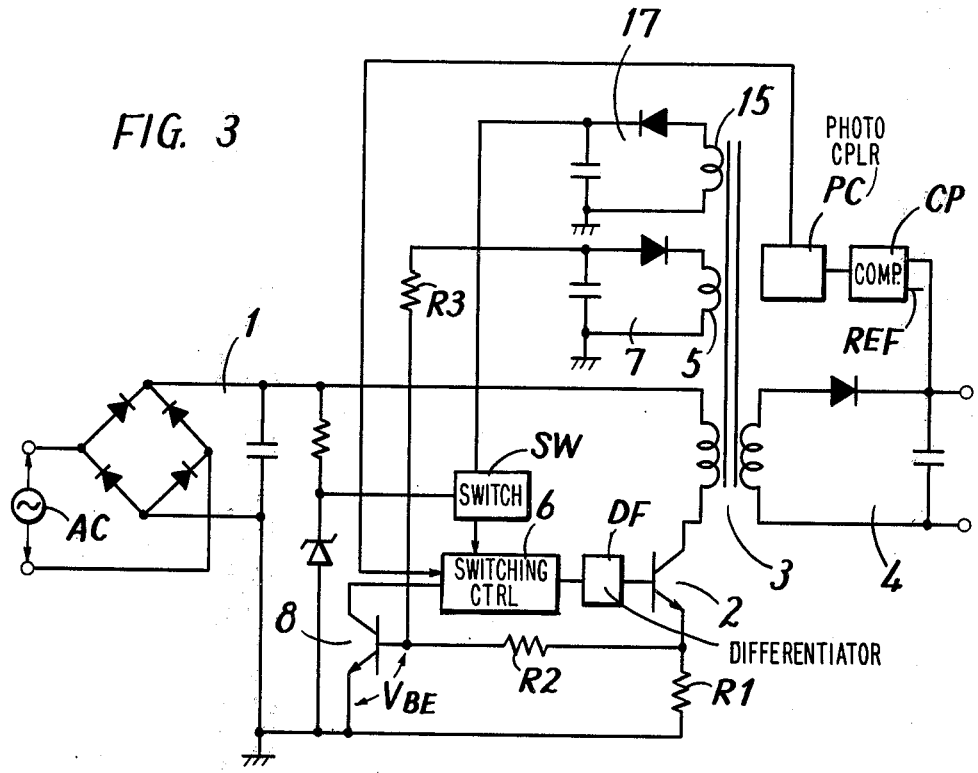
FIG. 3 is a schematic diagram of one embodiment of the present invention.

FIG. 3 shows a schematic diagram of a preferred embodiment of the present invention. Since FIG. 3 has been illustrated to show several additional components which were added to the FIG. 2 illustration, the same portions has been denoted by the same reference characters. Hence, it is not believed necessary to describe again the same portions as those seen in the FIG. 2 switching regulator. In the following, therefore, description will be made of the FIG. 3 embodiment centering on the major portions of the present invention. As will become more apparent from the following description, the FIG. 3 embodiment comprises three major characteristic features of the present invention.

At the outset, the first characteristic feature of the present invention will be described. The first feature of the present invention is directed to an improved protection circuit and comprises employment of a first auxiliary winding coupled to a high frequency transformer for the purpose of detection of an overload. More specifically, a first auxiliary winding 5 is provided coupled to the magnetic core of the high frequency transformer 3, which is connected to a third rectifying and smoothing circuit 7. According to the first feature of the present invention, an overload is detected in terms of a difference between the rectified output from the third rectifying and smoothing circuit 7 and the magnitude of a current flowing through the switching transistor 2 and the primary winding of the high frequency transformer 3. To that end, a resistor R1 is connected in series with the emitter electrode of the switching transistor 2. For the purpose of detecting the difference between the rectified output from the rectifying and smoothing circuit 7 and the current flowing through the switching transistor 2, a resistor network is connected to the third rectifying and smoothing circuit 7 and the current detecting resistor R1. More specifically, the resistor network comprises the resistors R2 and R3, wherein the resistor R2 is connected to the junction between the emitter electrode of the switching transistor 2 and the resistor R1 and the resistor R3 is connected to the output terminal of the rectifying and smoothing circuit 7, while the junction between the resistors R2 and R3 is connected to the base electrode of a transistor 8, which is utilized as a voltage controlled variable impedance means, as to be more fully described subsequenly. As seen in the FIG. 3 illustration, the switching transistor 2 comprises an NPN type and hence the junction between the emitter electrode of the switching transistor 2 and the resistor R1 is a relatively positive potential level. On the other hand, the rectifying and smoothing circuit 7 is structured such that the diode for the purpose of rectification is selected of the polarity so as to provide a relatively negative output at the output terminal of the rectifying and smoothing circuit 7. As a result, the resistor network comprising the resistors R2 and R3 serves to evaluate the difference between the voltage accross the resistor R1 representing the current flowing through the primary winding of the high frequency transformer 3 and the switching transistor 2 in a positive direction and the rectified output from the rectifying and smoothing circuit 7 representing the load in the negative direction. The difference value thus evaluated at the junction between the resistors R2 and R3 is applied to the input electrode of the transistor 8 serving as a voltage controlled variable impedance means. The transistor 8 is coupled to the switching control circuit 6 and, more specifically, to the pulse width modulator, as to be more fully described subsequently, for the purpose of reducing the pulse width of the high frequency pulses, whenever the switching regulator undergoes an undesired overload.

The FIG. 3 embodiment is shown further comprising additional components such as a second auxiliary winding 15, a fourth rectifying and smoothing circuit 17 coupled to the second auxiliary winding 15, a switch circuit SW for selectively supplying the rectified output from the rectifying and smoothing circuit 1 or the rectified output from the fourth rectifying and smoothing circuit 17. These components 15, 17 and SW constitute the second major feature of the present invention, as to be described subsequently. The FIG. 3 embodiment is further shown comprising another characteristic feature implemented by a differentiation circuit DF interposed between the input electrode of the switching transistor 2 and the high frequency pulse generator 6, as to be more fully described subsequently. It is pointed out that the FIG. 3 embodiment is shown comprising a comparator CP between the photocoupler PC and the output of the rectifying and smoothing circuit 4. The comparator CP is usually employed in this type of switching regulator. The comparator is structured to compare the rectified output from the rectifying and smoothing circuit 4 with a predetermined reference voltage REF, thereby to detect a fluctuation of the rectified output from the rectifying and smoothing circuit 4.

Since the circuit diagram of the FIG. 3 embodiment was described in the foregoing, more detailed description of the respective major features of the present invention will be described in the following. To that end, the first characteristic feature of the present invention will be described with simultaneous reference to FIG. 4, which shows a schematic diagram of the switching control circuit 6 together with the voltage controlled variable impedance transistor 8.

Now description will be mede of the operation of the first characteristic feature of the present invention. The transistor 8 is so biased that the base electrode of the same is biased in the negative direction by means of the resistors R2 and R3 in the normal operation by virtue of the negative voltage obtainable from the third rectifying and smoothing circuit 7 but is less biased to become conductive whenever an overload occurs and the inventive protection circuit starts to operate. The magnitude of the emitter current IE of the switching transistor 2 when the inventive protection circuit starts to operate by virtue of an overload is expressed by the following equation:

$$IE = \frac{R2 + R3}{R1 \cdot R3} VBE + \frac{R2}{R1 \cdot R3} VS$$

where VBE is the voltage between the base and emitter electrodes of the transistor 8 and VS is the rectified output voltage obtainable from the rectifying and smoothing circuit 7. Whenever an overload occurs and the emitter current IE of the switching transistor 2 exceeds the value defined by the foregoing equation, the transistor 8 becomes forward biased and hence becomes condutive, which serves to decrease the pulse width of the high frequency pulses obtainable from the switching control circuit 6, thereby to reduce the duty cycle of the current, as on/off controlled, flowing through the primary winding of the high frequency transformer 3 and the switching transistor 2. The decrease in the duty cycle of the current flowing through the primary winding of the high frequency transformer 3 reduces the output voltalge across the first auxiliary winding 5 and accordingly reduces the rectified output from the rectifying and smoothing circuit 7. As the rectified output from the rectifying and smoothing circuit 7 becomes small and hence approaches to the zero potential level, the transistor 8 tends to be more forward biased and hence the transistor becomes more conductive. This fact causes the pulse width of the high frequency pulses to be further reduced. It would be appreciated that according to the above described feature of the present invention, the protection circuit is implemented only with the components coupled to the primary winding side of the high frequency transformer 3 and the auxiliary winding without resort to any components in the secondary winding side of the transformer 3.

Figure 4:
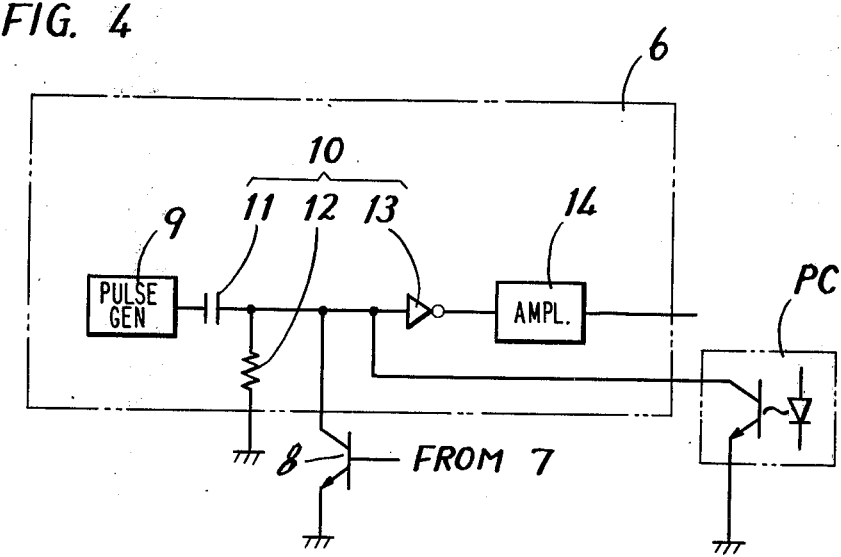
FIG. 4 shows a schematic diagram of the switching control in the FIG. 3 embodiment.

FIG. 4 shows a schematic diagram of the switching control circuit 6 together with the voltage controlled variable impedance transistor 8 shown in the FIG. 3 embodiment. Referring to FIG. 4, switching control circuit comprises a reference high frequency pulse generator 9 adapted to generate a train of high frequency reference pulses of such as 20 to 50 KHz, a pulse width modulator 10 and an amplifier 14. The pulse width modulator 10 comprises a differentiation circuit implemented by a capacitor 11 and a resistor 12 and a threshold detector 13 implemented by an inverter and adapted to threshold detect the differentiated output from the differentiation circuit at a given threshold level. The resistor 12 of the differentiation circuit is shunted by a phototransistor included in the photocoupler PC and is also shunted by the above described voltage controlled variable impendance transistor 8.

Figure 1:
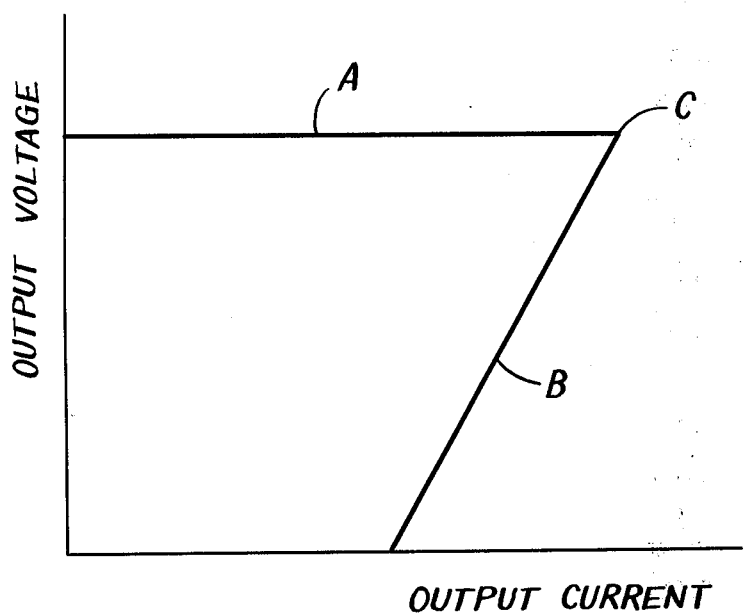
FIG. 1 shows an ideal characteristic of a stabilized voltage supply circuit and a protection circuit therefor.
Figure 5:
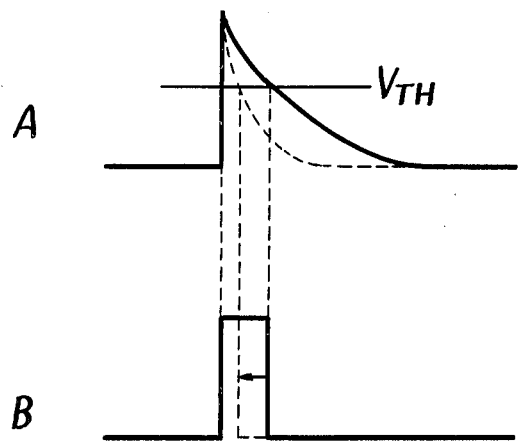
FIG. 5 shows wave forms of the signals at various portions in the FIG. 4 embodiment.

Operation of the pulse width modulator will be described with reference to FIG. 5, which shows wave forms of the signals at a few portions in the FIG. 4 embodiment. If and when the transistor 8 is in a non-conductive state, the differentiation circuit provides a differentiated output of the wave form as shown in the solid line in FIG. 5(A), but if the transistor 8 becomes conductive and the time constant of the capacitor 11 and the resistor 12 becomes small, the wave form of the differentiated output changes to the wave form as shown in the dotted line in FIG. 5(A). Since the differentiated output is threshold detected at a predetermined threshold value VTH, the pulse output as shown in the solid line in FIG. 5(B) is obtained from the threshold detector 13 when the transistor 8 is in a non-conductive state, while the pulse output as shown in the dotted line FIG. 5(B) is obtained from the threshold detector when the transistor 8 is in a conductive state. It would be appreciated that whenever an overload occurs a negative rectified output from the rectifying and smoothing circuit 7 becomes small which causes the voltage controlled variable impedance transistor 8 to be forward biased and to be conductive, which in turn makes small the impedance of the transistor 8 connected in parallel with the resistor 12 of the differentiation circuit, with the result that the time constant of the resistor 12 and the capacitor 11 of the differentiation circuit is decreased and accordingly the pulse width determined at the threshold level VTH is reduced. As a result, a proportional decrease of both the output voltage and the output current as shown as the oblique portion B in FIG. 1 is achieved.

Incidentally described, the resistor 12 of the differentiation circuit is also shunted by the phototransistor constituting the photocoupler PC, as described previously. The phototransistor of the photocoupler PC is controlled of the conduction as a function of the intensity of the light emission from a light source such as a light emitting diode which is energized by the output from the comparator PC. When the rectified output from the rectifying and smoothing circuit 4 exceeds a predetermined reference level REF, the comparator provides a corresponding output to the photocoupler, whereby the light emitting diode is energized accordingly. As a result, the phototransistor becomes in a corresponding conductive state, resulting in a decrease in the impedance thereacross. The decreased impedance across the phototransistor of the photocoupler PC accordingly decreases the time constant of the differentiation circuit for the above described reason and accordingly decreases the pulse width of the pulses obtained from the threshold detector 13. Thus, the pulse width of the pulses is modulated as a function of the rectified output from the rectifying and smoothing circuit 4 in a normal operation state. Such a normal operation state of the pulse width modulation is shown as the horizontal portion A in FIG. 1.

According to the above described first characteristic feature of the present invention, an overload is detected by the use of the first auxiliary winding 5 coupled to the high frequency transformer 3, in comparison with the primary current detected output. Thus, an overload can be detected with a simple auxiliary winding without resort to an additional photocoupler to be coupled to the secondary winding side of the transformer 3. This makes it possible to detect an overload with accuracy and with an inexpensive cost, thereby to reduce the duty cycle of the pulse width modulator for the purpose of protection in case where an overload occurs.

Referring again to FIG. 2, the switching control circuit 6 is shown energized with the voltage divided output of the rectified output from the rectifying and smoothing circuit 1. In case of an increased capacity of such a switching regulator, accordingly an increased capacity of switching transistor 2 is required and accordingly an increased power of the switching control circuit 6 is required for driving such a switching transistor 2 of an increased capacity. Such an increased power requirement in the switching control circuit 6 accordingly requires an increase of capacity of the resistor and the Zener diode for voltage divider. By way of an example, if a large capacity switching regulator is desired, the power consumption in the voltage divider becomes as large as say 10 watts. Thus, energization of the switching control circuit 6 through the voltage divider coupled to the rectified output of the rectifying and smoothing circuit 1 is disadvantageous because of an increase in power consumption and heat when a switching regulator of an increased capacity is to be implemented. The above described second characteristic feature of the present invention briefly described with reference to FIG. 3 effectively eliminates such a problem. Thus, the second characteristic feature of the present invention will now be described in more detail.

Figure 6:
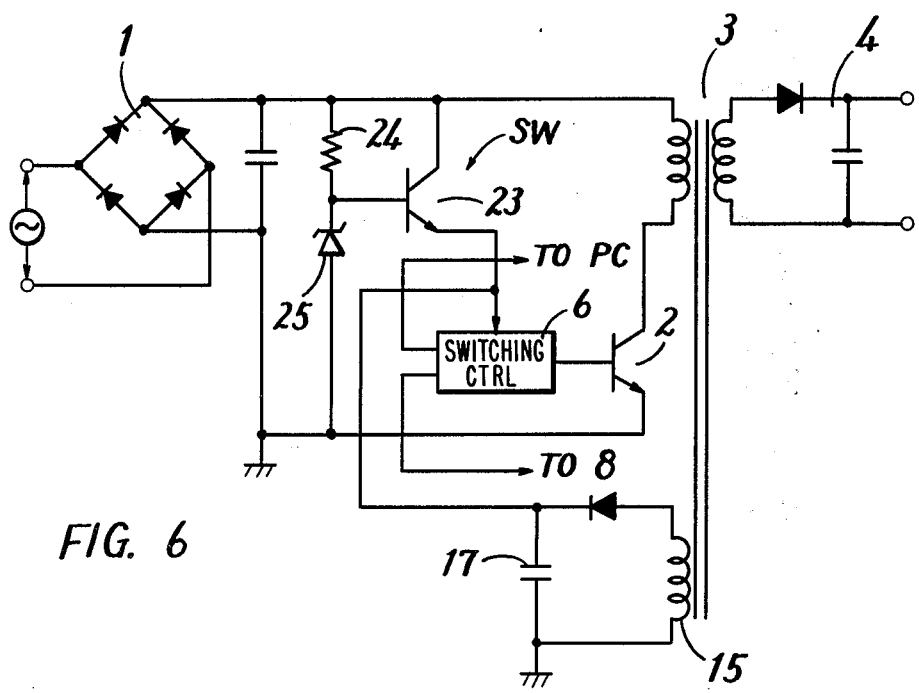
FIG. 6 is a schematic diagram of another feature of the present invention.

FIG. 6 shows a schematic diagram of the above described second feature of the present invention, wherein only the components 15, 17 and SW briefly described with reference to FIG. 3 are shown in more detail, while some of the remaining portions have been omitted for simplicity of illustration. It is pointed out that the same portions has been denoted by the same reference characters in FIGS. 3 and 6.

Referring to FIG. 6, the switch circuit SW comprises a transistor 23 coupled between the output from the rectifying and smoothing circuit 1 and the switching control circuit 6. The input electrode of the transistor 23 is connected to receive a voltage divided output obtainable from the potential divider comprising the resistor 24 and the Zener diode 25, such that the transistor 23 is initially forward biased by the voltage divided output of the rectified output from the rectifying and smoothing circuit 1. The transistor 23 comprises an NPN type transistor an emitter electrode of which is connected to the switching control circuit 6. The emitter electrode of the transistor 23 is also connected to the output of the rectifying and smoothing circuit 17 coupled to the second auxiliary winding 15 of the high frequency transformer 3. It should be noted that a diode serving as a rectifier in the rectifying and smoothing circuit 17 is connected such that the positive output is applied to the emitter electrode of the transistor 23.

In operation, when a power switch is turned on, the rectified output is first obtained from the rectifying and smoothing circuit 1 and accordingly the transistor 23 is forward biased, whereby the transistor 23 becomes conductive. As a result, the switching control circuit 6 is energized through the transistor 23 now in conduction with the rectified output from the rectifying and smoothing circuit 1. As a result, the switching regulator shown starts to operate in the same manner as described in conjunction with the FIG. 3 embodiment. As a result, a voltage is developed across the second auxiliary winding 15 and accordingly a positive rectified output is obtained from the rectifying and smoothing circuit 17. As the positive rectified output thus obtained from the rectifying and smoothing circuit 17 increases, the transistor 23 finally comes to be reverse biased because of an increased positive output applied to the emitter electrode of the transistor 23 and hence the transistor 23 finally becomes non-conductive, with the result that the switching control circuit 6 comes to be energized with the rectified output from the rectifying and smoothing circuit 17 rather than with the rectified output from the rectifying and smoothing circuit 1. In other words, the switching control circuit 6 is initially energized by the rectified output from the rectifying and smoothing circuit 1, but, after the rectified output from the rectifying and smoothing circuit 17 is once established, the switching control circuit 6 is thereafter energized by the rectified output from the rectifying and smoothing circuit 17. Since the power for energizing the switching control circuit 6 is normally obtained from the high frequency transformer by the use of the second auxiliary winding 15, any voltage dividing circuit of an increased capacity required for energization of the switching control circuit 6 can be dispensed with, with the result that the power consumption caused by such voltage dividing circuit of an increased capacity can be eliminated and hence the switching regulator can be made compact. Incidentally described, the voltage dividing circuit implemented by the resistor 24 and the Zener diode 25 may be of a small capacity, inasmuch as the power is required only for forward biasing the transistor 23. By way of an example, the power consumption in such voltage dividing circuit is as small as 1/10 watts even in a large sized switching regulator.

Now the third characteristic feature of the present invention will be described. As briefly described previously, the FIG. 3 embodiment comprises the differentiation circuit DF combined with the switching transistor 2, which constitutes the third feature of the present invention. Thus, more detailed description will be made of a combination of the differentiation circuit DF with the switching transistor 2.

Since in the switching regulator the rectified direct current output is on/off controlled by the use of a switching transistor which is operated with pulses of a high frequency such as 20 to 50 KHz, it has been a most common practice to employ a high frequency switching transistor of a small storage time for the purpose of on/off controlling the rectified direct current output.

Figure 7:
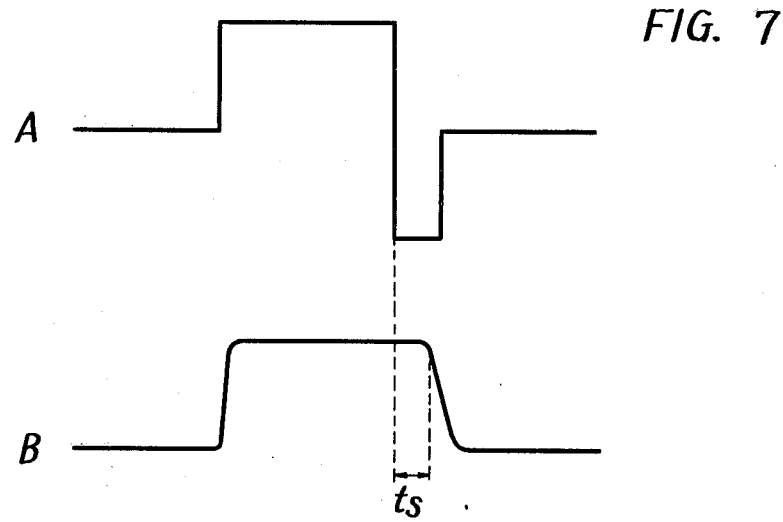
FIG. 7 shows wave forms of the pulses to be used in the above described embodiments.

FIG. 7 shows a wave form A of a pulse used for driving such a high frequency switching transistor and a wave form B of a current flowing through such a high frequency switching transistor as driven by such a driving pulse. With particular reference to the wave form A in FIG. 1, such a driving pulse is adapted to have a positive going period for rendering such a high frequency switching transistor conductive which is followed by a negative going pulse of a rather short period for interrupting the transistor for the purpose of making small the storage time of the transistor. If such a high frequency switching transistor is driven with a driving pulse as shown as the wave form A in FIG. 1, then the output of the wave form B in FIG. 7 is obtained from such a high frequency switching transistor. As well known to those skilled in the art, however, such a high frequency switching transistor is expensive and a large driving power is required in order to drive such a high frequency switching transistor with the above described driving pulse, inasmuch as the base current flows throughout the conduction period of the transistor, resulting in a poor efficiency. Hence, the third feature of the present invention is aimed to eliminate such disadvantages, by providing an improved driving of a switching transistor in a switching regulator.

Figure 8:
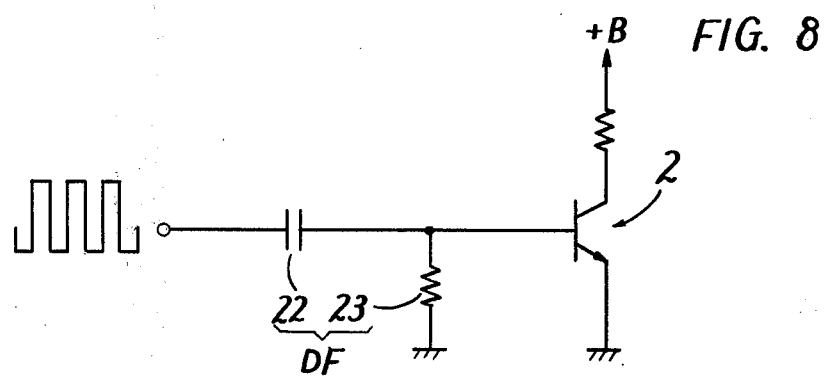
FIG. 8 shows a schematic diagram of a preferred embodiment of the switching means in the above described embodiments.

FIG. 8 shows a schematic diagram of the differentiation circuit DF combined with the switching transistor 2 in accordance with the third feature of the present invention. The differentiation circuit DF comprises a series connected capacitor 22 and a parallel connected resistor 23, the junction of the capacitor 22 and the resistor 23 being connected to the base electrode of the switching transistor 2. Thus, a train of driving pulses is applied through the differentiation circuit DF to the switching transistor 2. Accordingly to the third feature of the present invention, the switching transistor 2 may be a transistor of relatively a long storage time for the reason described in the following.

Figure 9:
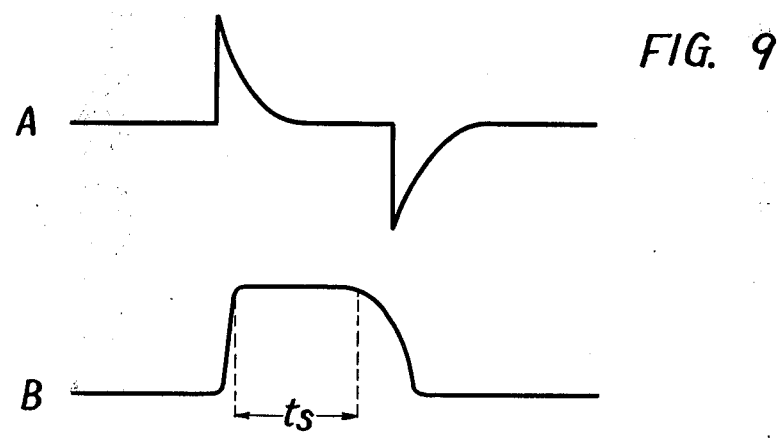
FIG. 9 shows a wave form of the signal to be applied to the switching transistor.

FIG. 9 shows at A and B the wave forms of the input and output, respectively, of the switching transistor 2. Since the driving pulses are applied through the differentiation circuit DF to the switching transistor 2, the pulses are differentiated by the differentiation circuit DF, and a differentiated output of the wave form A shown in FIG. 9 is applied to the switching transistor, 2, wherein the positive going pulse corresponds to the leading edge of the driving pulse while the negative going pulse corresponds to the trailing edge of the driving pulse. Therefore, the switching transistor 2 becomes conductive in response to the positive going differentiated pulse and the conduction state is kept in accordance with the storage time ts of the switching transistor 2, as employed, whereupon the storage time ts is assuredly terminated in response to the negative going differentiated pulse. Preferably, the storage time ts of the switching transistor 2 is slightly larger than a half cycle of the driving pulses. According to the embodiment shown, the conduction period can be made uniform with the negative going differentiated output, even if the storage time ts is diversified depending on each switching transistor. As a result of experimentation, it has been observed that the time constant of the differentiation circuit DF is preferably smaller than one fifth of the conduction period of the switching transistor 2.

According to the present invention, a switching transistor of a larger storage time exhibiting a poor high frequency characteristic can be used as a switching transistor in a switching regulator. In addition, such a switching transistor is driven with a differentiated output of the driving pulses through skillful use of a larger storage time ts of such a switching transistor. As a result, a driving power is considerably reduced as compared with a conventional switching regulator employing a high frequency switching transistor of a small storage time. Hence, a compact and inexpensive switching regulator can be provided.

Although the present invention has been described and illustrated in detail, it is to be clearly understood that the same is by way of illustration and example only and is not to be taken by way of limitation, the spirit and scope of the present invention being limited only by the terms of the appended claims.

What is claimed is:

1. A switching regulator power supply, comprising:
   alternating current power supply means;
   first rectifying means coupled to said alternating current supply means for rectifying the alternating current output;
   means for generating high frequency pulses the duty cycle of which is variable as a function of a control signal;
   switching means coupled to said first rectifying means and responsive to the output of said high frequency pulse generating means for on/off controlling the rectified output from said first rectifying means;
   high frequency transformer means including a primary winding coupled to receive the output from said switching means, a secondary winding, and a first auxiliary winding on the primary winding side of said transformer means;
   second rectifying means coupled to said secondary winding of said high frequency transformer means for rectifying the transformed output from said high frequency transformer means;
   means for supplying the rectified output from said second rectifying means to said high frequency pulse generating means as said control signal;
   means operatively coupled to said switching means for detecting a current flowing through said switching means;
   means coupled to said first auxiliary winding for detecting a voltage corresponding to the output of said switching means;
   means coupled to said current detecting means and said voltage detecting means for detecting a difference between the output from said current detecting means and the output from said voltage detecting means; and means operatively coupled to said high frequency pulse generating means and responsive to the difference detected output from said difference detecting means for reducing the duty cycle of the high frequency pulse obtainable from said high frequency pulse generating means, whereby a current flowing through said switching means is controlled to a value less than a current value set by said current detecting means whenever a given value of overload occurs.

2. A switching regulator in accordance with claim 1, wherein said duty cycle reducing means comprises voltage controlled variable impedance means coupled to the control input of said high frequency pulse generating means.

3. A switching regulator in accordance with claim 2, wherein said voltage controlled variable impedance means comprises transistor means the conduction of which is variable as a function of a control signal.

4. A switching regulator in accordance with claim 2, wherein said high frequency pulse generating means comprises
reference pulse generating means for generating high frequency reference pulses,
means coupled to said reference pulse generating means for differentiating the high frequency reference pulses, and
means for threshold detecting the differentiated output from said differentiating means.

5. A switching regulator in accordance with claim 1, wherein said difference detecting means comprises resistor voltage dividing means.

6. A switching regulator in accordance with claim 1, wherein said current detecting means comprises resistor means coupled in series with said switching means.

7. A switching regulator in accordance with claim 1, wherein the frequency of the pulses from said high frequency pulse generating means is selected to be higher than 15 KHz.

8. A switching regulator in accordance with claim 7, wherein said switching means comprises switching transistor means.

9. A switching regulator in accordance with claim 8, wherein the storage time of said switching transistor means is selected to be larger than a half cycle of the pulses obtained from said high frequency pulse generating means.

10. A switching regulator in accordance with claim 9, which further comprises differentiation circuit means coupled to the input of said switching transistor means.

11. A switching regulator in accordance with claim 10, wherein the time constant of said differentiating means is selected to be smaller than one fifth of the storage time of said switching transistor means.

12. A switching regulator, comprising:
alternate current power supply means;
first rectifying means coupled to said alternate current power supply means for rectifying the alternate current output;
means for generating high frequency pulses the duty cycle of which is variable as a function of a control signal;
switching means coupled to said first rectifying means and responsive to the output of said high frequency pulse generating means for on/off controlling the rectified output from said first rectifying means;
high frequency transformer means coupled to receive the output from said switching means, and including first auxiliary winding means;
second rectifying means coupled to said high frequency transformer means for rectifying the transformed output from said high frequency transformer means;
means for supplying the rectified output from said second rectifying means to said high frequency pulse generating means as said control signal;
means operatively coupled to said switching means for detecting a current flowing through said switching means;
means coupled to said current detecting means and said first auxiliary winding means for detecting a difference between the output from said current detecting means and the output from said first auxiliary winding means;
means operatively coupled to said high frequency pulse generating means and responsive to the difference detected output from said difference detecting means for reducing the duty cycle of the high frequency pulse obtainable from said high frequency pulse generating means, whereby a current flowing through said switching means is controlled to a lesser value whenever a given value of overload occurs; and
third rectifying means coupled to said first auxiliary winding means for withdrawing the rectified output to said difference detecting means in the polarity opposite to that of the output of said current detecting means.

13. A switching regulator in accordance with claim 12, wherein said difference detecting means comprises resistor voltage dividing means coupled to receive the output from said current detecting means and the output from said third rectifying means in the opposite polarity.

14. A switching regulator in accordance with claim 12 wherein said high frequency pulse generating means comprises:
reference pulse generating means for generating high frequency reference pulses;
means coupled to said reference pulse generating means for differentiating the high frequency reference pulses;
means for threshold detecting the differentiated output from said differentiating means; and
means responsive to the rectified output from said second rectifying means for varying the time constant of said differentiating means;
wherein said duty cycle reducing means comprises voltage controlled variable impedance means coupled to the control input of said high frequency pulse generating means.

15. A switching regulator in accordance with claim 1, wherein said voltage controlled variable impedance means is adapted to vary the time constant of said differentiating means.

* * * * *